Feb. 5, 1924.

F. G. WHITE 1,482,450

POWER TRANSMISSION MECHANISM

Filed Aug. 26, 1921     4 Sheets-Sheet 1

INVENTOR
Fred G. White
BY
ATTORNEY

Feb. 5, 1924.

F. G. WHITE

POWER TRANSMISSION MECHANISM

Filed Aug. 26, 1921  4 Sheets-Sheet 3

1,482,450

INVENTOR
Fred G. White
BY
ATTORNEY

Feb. 5, 1924.

F. G. WHITE

POWER TRANSMISSION MECHANISM

Filed Aug. 26, 1921

INVENTOR
Fred G. White.
BY
ATTORNEY

Patented Feb. 5, 1924.

1,482,450

UNITED STATES PATENT OFFICE.

FRED G. WHITE, OF KANSAS CITY, MISSOURI, ASSIGNOR TO LEWIS R. LONG, OF KANSAS CITY, MISSOURI.

POWER-TRANSMISSION MECHANISM.

Application filed August 26, 1921. Serial No. 495,691.

*To all whom it may concern:*

Be it known that I, FRED G. WHITE, a citizen of the United States, residing at Kansas City, in the county of Jackson and State of Missouri, have invented certain new and useful Improvements in Power-Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to power transmission gearing and one of the objects of the invention is to provide a driving means and a driven means in which the driving means operates continuously at approximately the same speed and intermittently drives the driven means, there being certain timing mechanism between the driving means and the driven means so that the driven means will be operated at definite intervals in the cycle of operations of the driving means.

Means is also provided whereby the driven means will come to a definite state of rest and remain inoperative for a predetermined period and I have provided a transmission gearing in which certain of the gears multiply the power applied to the driven shaft to initially start the driven shaft at relatively slow speed but with the maximum of power to overcome the inertia of the part to be driven, and after the driven element has started to move, the power is decreased but the speed is increased to complete the movement of the driven means.

This is an important feature in movable sign construction because it makes it possible to provide an efficient sign panel operating mechanism adapted to allow the signs to remain at a state of rest for a definite period and then to easily move the sign elements to present new panel faces to view and to effect a quick change so that the interval between the periods of the state of rest will be relatively short as compared to the periods at which the signs will remain at rest and, therefore, my invention is particularly adapted for this class of devices although it is not necessarily limited thereto.

The invention consists in certain novel parts and combinations of parts, all of which will be specifically described hereinafter, reference being had to the accompanying drawings, in which Fig. 1 is a side elevational view of a transmission gearing constructed in accordance with my invention.

Fig. 7 is a detail perspective view of a stationary gear co-operating with a complementary gear which planetates about it.

Figure 1:
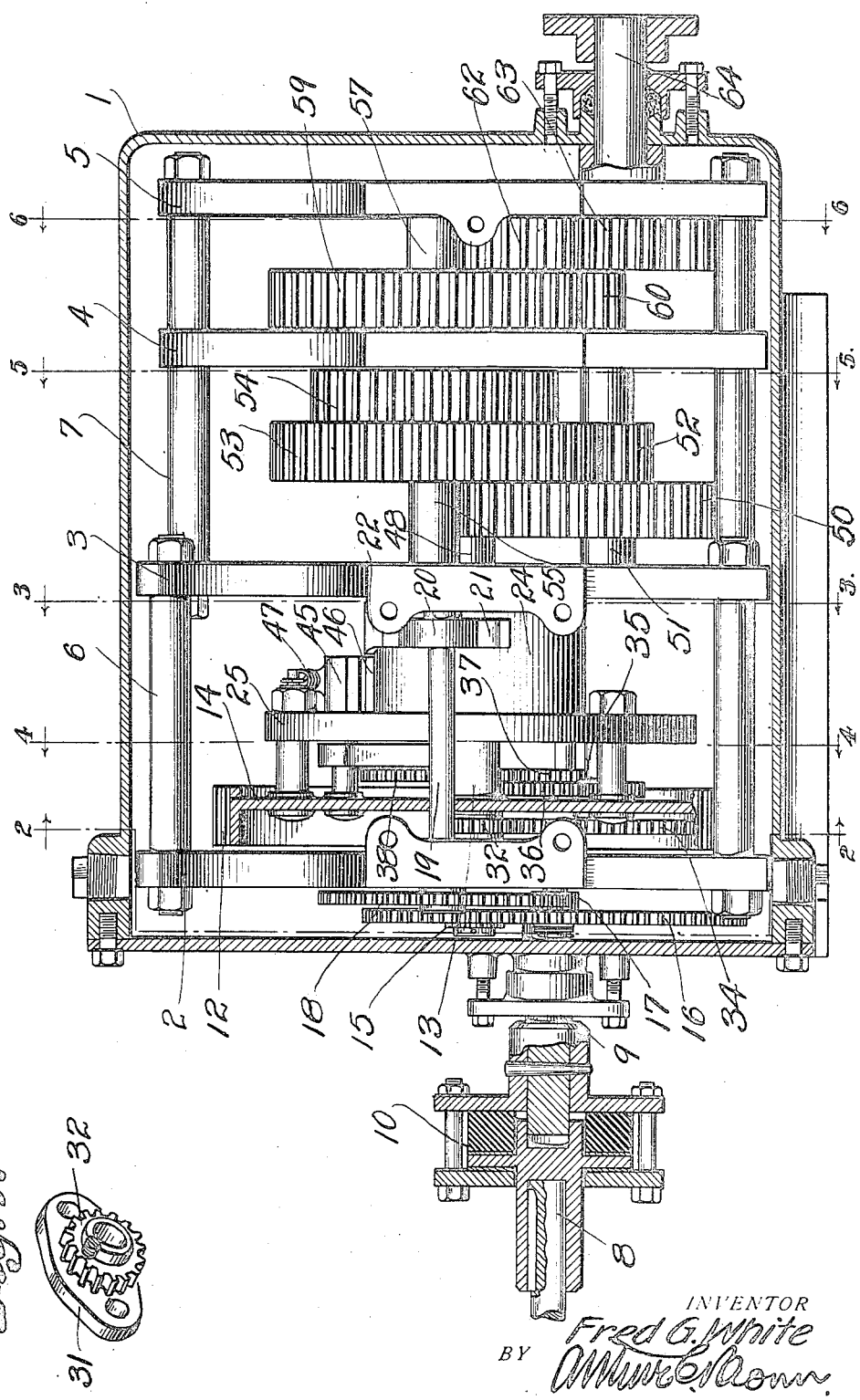

1 designates a gear case in which is arranged a plurality of gear frames designated 2, 3, 4 and 5 respectively, the frames 2 and 3 being connected by the longitudinal bolts 6 and the frames 3, 4 and 5 being connected by the bolts 7. The frames are held in spaced relation by the bolts and a suitable supporting gearing, which will be described hereinafter.

The mechanism is driven from a driving shaft 8, having a slip clutch engagement with a pinion shaft 9 which is part of the drive shaft but connected thereto by the slip clutch 10 of appropriate construction.

Figure 2:
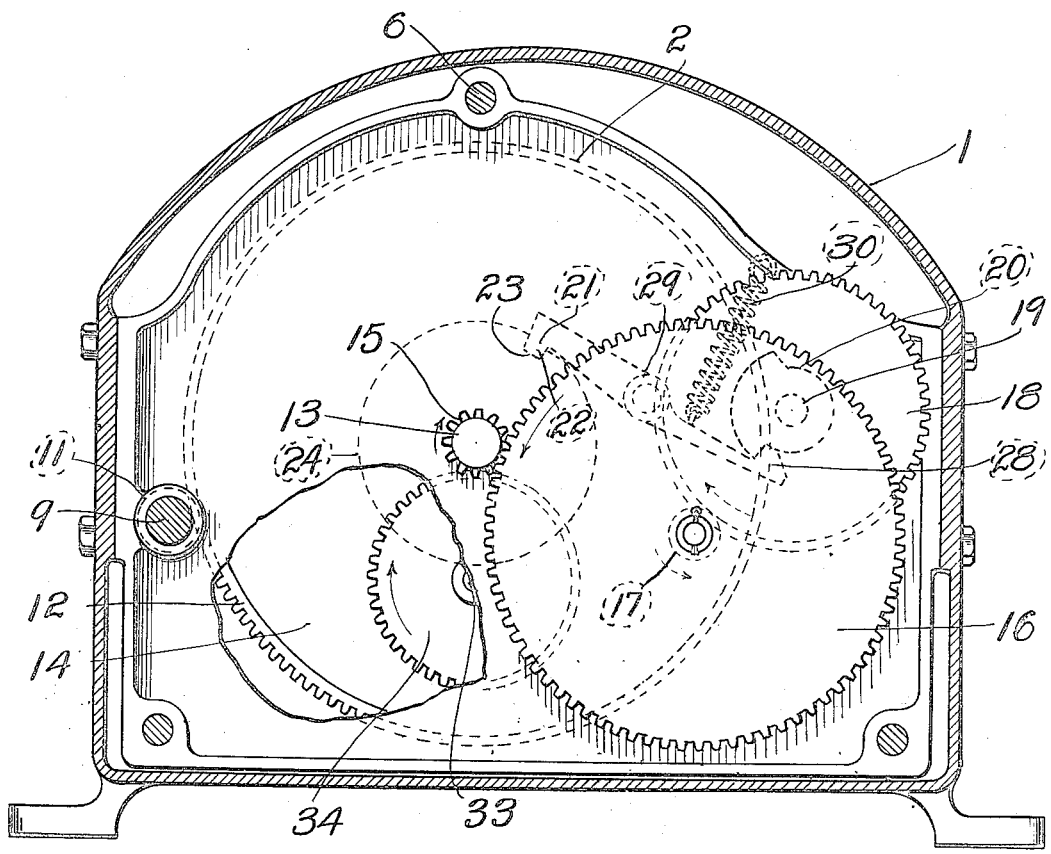
Fig. 2 is a cross sectional view on the line 2—2 of Fig. 1.

The part 9 of the drive shaft carries a pinion 11 which drives a gear 12 supported by a shaft 13 mounted in the frames 2 and 3. The gear 12 is provided with a web 14 which supports suitable gears. The shaft 13 projects through the web 14 of the gear 12 and is fastened thereto. The end of the shaft 13, projected through one side of the gear 12, that is, through the web 14, carries a pinion 15, which meshes with the gear 16 (see Fig. 2) and said gear 16 carries a pinion 17, which meshes with the gear 18 on the shaft 19 to one side of the gear 12 and carrying a cam 20.

The gears 16, 17 and 18 are mounted on shafts supported by the frame 2 and by reference to Fig. 1, it will be observed that the shaft 19 extends past the frame 2 and in juxtaposition to frame 3, at which point it carries the cam 20, which rotates with it to actuate a detent or dog 21 having a tooth 22 to move into and out of engagement with the notch 23 on a hub 24, supported by the ring bearing 25, carried by the web 14 of the gear 12 and by a bearing in the frame 3. The hub is adapted to be held stationary by the dog or detent 21 when the tooth 22 is in engagement with the notch 23 but when the detent is released, the actuated dog will engage the projection on the hub 24 and cause it to rotate with the gear 12.

Figure 3:
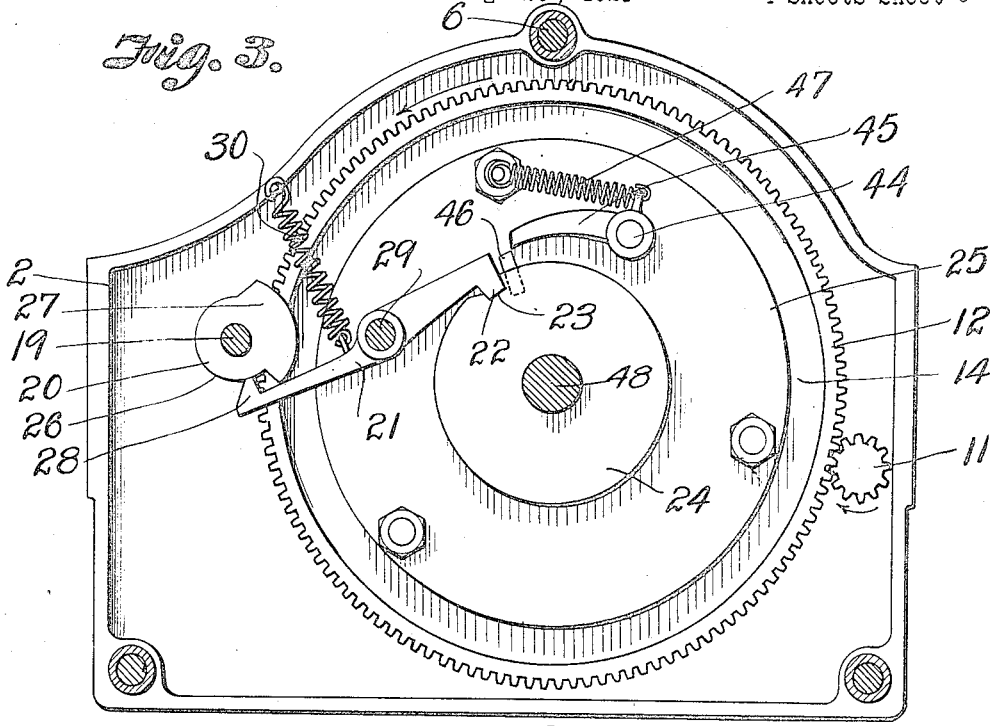
Fig. 3 is a cross sectional view on the line 3—3 of Fig. 1, looking in the direction of the arrow.
Figure 4:
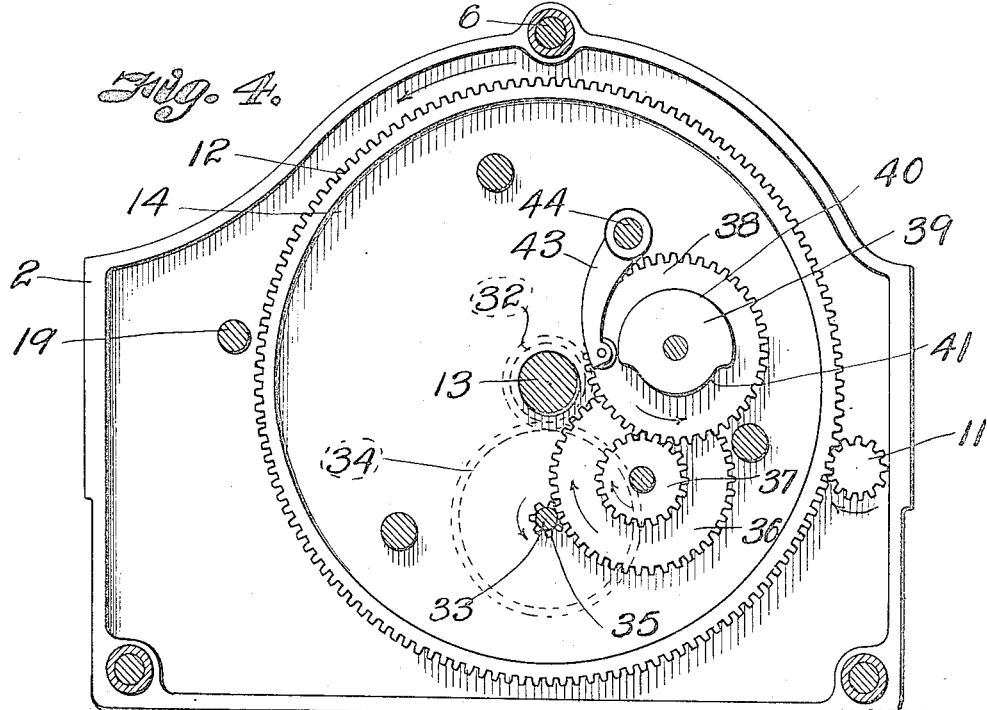
Fig. 4 is a cross sectional view on the line 4—4 of Fig. 1, looking in the direction of the arrow.

The cam 20 is provided with a low lobe 26 and a high lobe 27. The low lobe constitutes about two-thirds of the cam and the high lobe one-third of the cam so if the tooth 28 of the detent 21 is riding on the low lobe, the tooth 22 will be in engagement with the notch but if the high lobe 27 is bearing against the tooth 28, the detent will be swung on its pivot 29 so that the tooth 22 will be out of engagement with the notch 23, there being a normal tendency to throw the tooth 22 into engagement with the notch through the medium of the tension spring 30 (see Fig. 3).

The pick-up mechanism for the hub consists of the following gears and pawl mechanism operated thereby.

Secured to the frame 2 is a bracket 31, which carries a rigid pinion 32, that is, the pinion is rigid with the bracket or plate so that it will not rotate. Carried by the shaft 33 journaled in the web 14 is a gear 34, which revolves about the rigid pinion 32 when the gear 12 rotates and because the gear 34 is in mesh with the pinion 32, it will rotate about the axis of the shaft 33, which is journaled in the web 14 and thereby impart a rotative movement to the pinion 35 on the opposite side of the web 14.

The pinion 35 meshes with a gear 36, carrying rigid therewith a pinion 37, which meshes with a cam supporting gear 38, the cam 39 carried thereby having a high lobe 40 and a low lobe 41. The high lobe 40 of the cam 39 constitutes about two-thirds of the cam while the low lobe constitutes about one-third of the cam. Therefore, the high lobe of the cam 39 will be in contact with the crank arm 43 on the shaft 44 about two-thirds of the rotation of the complete revolution of the cam 39 and the low lobe will be in contact with the crank arm 43 about one-third of the rotation of the complete revolution of the cam 39.

When the high lobe 40 is in engagement with the cam on the arm 43, the pick-up pawl or dog 45 on the shaft 44 will be raised out of the path of the spur or projection 46 rigid on the hub 24 but when the low lobe is in engagement with the end of the arm 43, the spring 47 will throw the toe of the dog 45 into position to abut against the spur or projection 46 so that as the gear 12 rotates, it will rotate the hub 24 with it. Therefore, it will be apparent that the hub 24 and the gear 12 will rotate together about one-third of the cycle of operation of the gears and that they will remain stationary about two-thirds of the cycle of operation of the gears. Since the ratio between the gear 12 and the gear 38 is about forty-two to one, it will be seen that there will be a relatively long period of cessation of movement of the hub 24 and since the hub 24 is mounted on a shaft 48 which is the intermediate drive shaft between the main driving shaft and the driven shaft, it will be clear that the driven shaft can only operate intermittently since it takes its movement indirectly through gearing from the hub shaft 48.

The shaft 48 carries a pinion 49, which meshes with a gear 50 carried by a shaft 51 and on which is a pinion 52, meshing with a gear 53 which carries an elliptical gear 54, eccentrically mounted on the shaft 55 and meshing with a complementary elliptical gear 56 eccentrically mounted on a shaft 57. The ratio between the gear 54 and the pinion 49 is approximately one to fourteen and it will be noted that when the gear 53 rotates about its shaft 55 and carries with it the elliptical gear 54, that the distance between the axis of the gear 54 and the axis of the gear 56 will be such that the gear 54 will act as a pinion meshing with the teeth of the relatively larger gear 56 so that the leverage on the line 58 of the gear 56 will be relatively great so that the shaft 57 will be rotated at a relatively slow speed as compared with the shaft 55 but its power will be multiplied.

The shaft 57 carries a gear 59, which meshes with a pinion 60 on the shaft 61 and on which is mounted a gear 62, meshing with a pinion 63 on the driven shaft 64, which may be coupled to the elements to be driven in any appropriate manner.

Figure 5:
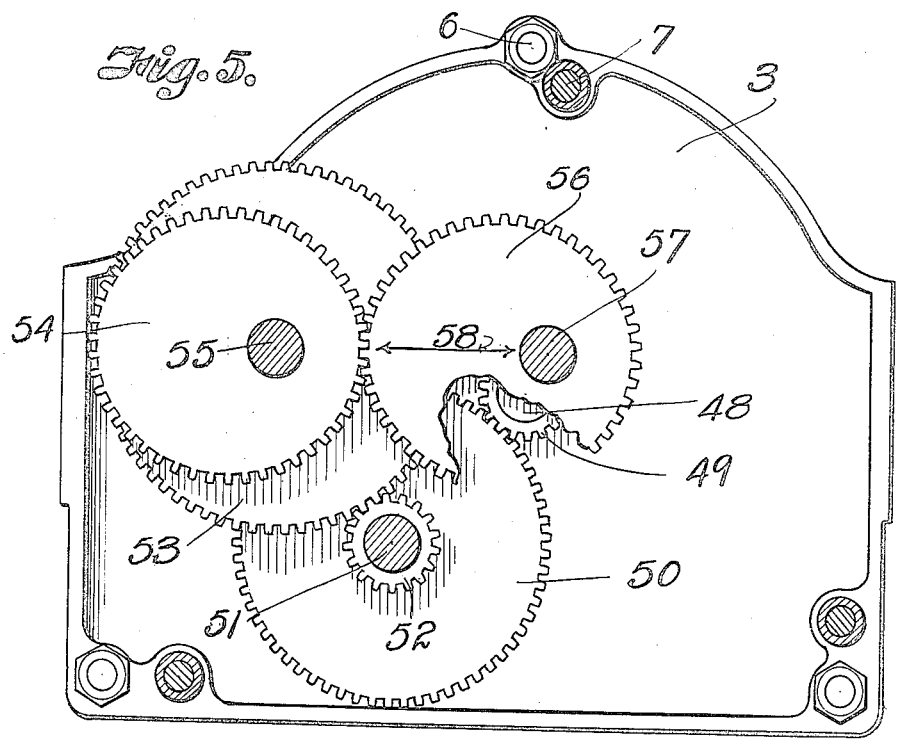
Fig. 5 is a cross sectional view on the line 5—5 of Fig. 1, looking in the direction of the arrow.
Figure 6:
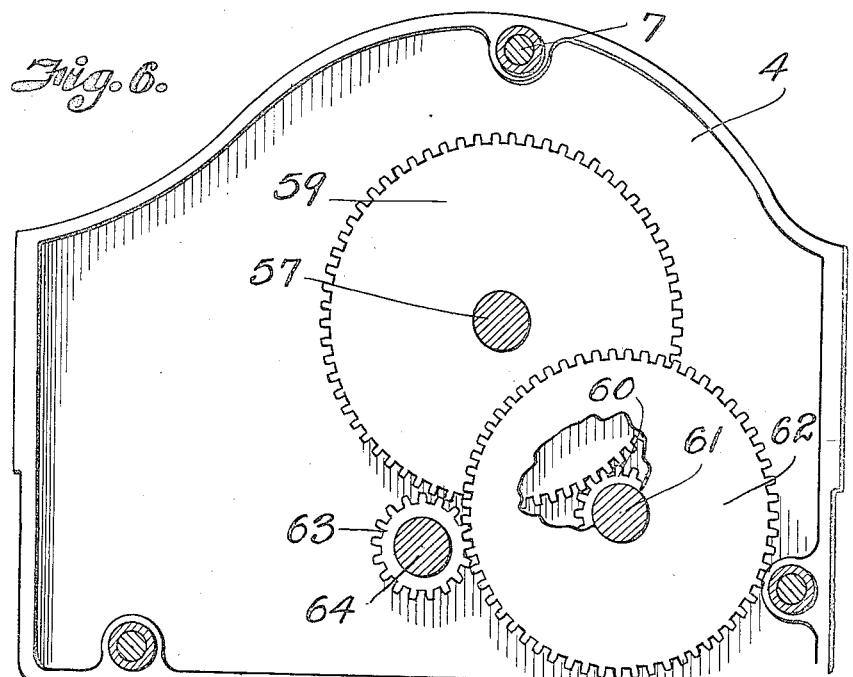
Fig. 6 is a cross sectional view on the line 6—6 of Fig. 1, looking in the direction of the arrow.

The driving mechanism may be divided into four main division; the main driving shaft, the intermittently operating mechanism consisting of the gears for driving and releasing the hub 24 and the hub; the intermediate or power changing gears shown in Fig. 5, and the driven gears shown in Fig. 6.

The main driving shaft consisting of the elements 8 and 9 and their clutch element 10 may be continuously driven at a uniform rate and they will drive the main gear 12 at a constant speed and the gearing actuated by the main drive gear 12 will be effective in intermittently releasing and picking up the hub 24 for the purpose of controlling its movement. Whenever the hub 24 rotates, the shaft 48 will rotate and since the shaft 48 is geared to the power transmitting mechanism consisting of the pinion 49, gear 50, shaft 51, pinion 52, gear 53 and the elliptical gears 54 and 56, it will be apparent that whenever the hub is rotating, the power changing gears must rotate and by reference to Fig. 5 it will be observed that in the initial movement of the shaft 48 rigid with the hub 24, the gears will be effective in first rotating the shaft 57 at a relatively slow speed and thereby imparting a relatively slow movement to the multiplying gearing shown in Fig. 6 in such a manner that the driven shaft 64 will have an initial movement imparted to it at a relatively slow speed until the inertia of the part operated by the shaft 64 has been overcome and then the multiplying side of the gear 54 will begin to have meshing contact with the gear 56 to increase the speed during the cycle of operations until the high lobe of the cam 20 rides off the tooth 28, allowing the tooth 22 to drop in 23 and the high lobe of the cam 39 rides on the end of the crank 43 to raise the pawl or pick-up dog 45 out of the path of the spur or projection 46.

By reference to the drawings it will be apparent that the elliptical gears bear such relation one to the other that the driven gearing will start to operate at a relatively slow speed, then accelerate as the positions of the elliptical gears change, and finally slow down so that just before the pick-up mechanism releases the hub, the driven shaft will be moving at the slowest speed. In other words, the driven shaft will begin its movement at a relatively slow speed to overcome inertia, then accelerate, and finally slow down so that the driven elements may come to a state of rest without unduly jarring the frames or gears and without danger of overrunning.

It will be apparent that the gearing can be made relatively rugged so as to adequately serve the purpose for which it is intended and that the gears can be compacted in a case so that they will not take up an unusual amount of room.

It will also be apparent that the operation of the mechanism will be entirely automatic and that there will be an intermittent, variable speed transmitted from the power shaft to the driven shaft at proper intervals; also that the sign or other element to be actuated through the shaft 64 can be so designed that it will partake of the proper movement of the shaft 64 in any appropriate manner.

What I claim and desire to secure by Letters Patent is:

1. A power transmitting mechanism comprising a driving shaft, a variable speed mechanism, an intermittently operating mechanism for clutching and unclutching the variable speed mechanism to the driving shaft, and a driven shaft operated from the variable speed mechanism.

2. In a power transmission mechanism, a driving shaft, a variable speed mechanism comprising a gear train in which are two constantly meshing elliptical gears to vary the speed of certain of the gears in the train, and means for intermittently clutching and unclutching the variable speed mechanism with the driving shaft.

3. A power transmitting gearing comprising a driving element and a driven element, gears interposed between the driving element and the driven element and mounted to effect intermittent driving connections between the driving element and the driven element, said gears having in their train constantly meshing elliptical gears to vary the speed of the driven element during the cycles of operations of the gears.

4. A power transmitting mechanism comprising a driving shaft, a gear wheel, a pinion on the driving shaft imparting motion to the gear wheel, a hub concentric with the gear wheel, means controlled by the gear wheel for intermittently connecting and disconnecting the hub to the gear wheel, a shaft rotated by the hub when it is actuated by the gear wheel, complementary gears driven by said shaft, complementary elliptical gears operated in response to the gears operated by the last mentioned shaft, and a driven shaft movable in response to movement of one elliptical gear, the elliptical gears being so mounted with respect one to the other that a variable speed ratio will automatically take place during their cycle of operation.

In testimony whereof I affix my signature.

FRED G. WHITE